United States Patent [19]
Warady et al.

[11] Patent Number: 6,067,522
[45] Date of Patent: May 23, 2000

[54] HEALTH AND WELFARE BENEFIT ENROLLMENT AND BILLING SYSTEM AND METHOD

[76] Inventors: Arthur D. Warady, 3 Spring Hollow Rd., Radnor, Pa. 19087; Robert W. Owen, 606 Bair Rd., Berwyn, Pa. 19312

[21] Appl. No.: 08/609,478

[22] Filed: Mar. 1, 1996

[51] Int. Cl.[7] .................................................. G06F 17/60
[52] U.S. Cl. ............................................... 705/2; 707/104
[58] Field of Search ................................ 705/1, 2, 3, 30, 705/34; 707/1, 2, 10, 100, 102, 104

[56] References Cited

U.S. PATENT DOCUMENTS

| | | | |
|---|---|---|---|
| 4,347,568 | 8/1982 | Giguere et al. | 600/300 |
| 4,648,037 | 3/1987 | Valentino | 705/36 |
| 4,893,270 | 1/1990 | Beck et al. | 364/400 |
| 4,987,538 | 1/1991 | Johson et al. | 705/2 |
| 5,018,067 | 5/1991 | Mohlenbrock et al. | 600/300 |
| 5,235,702 | 8/1993 | Miller | 705/102 |
| 5,301,105 | 4/1994 | Cummings, Jr. | 705/2 |
| 5,307,262 | 4/1994 | Ertel | 705/2 |
| 5,359,509 | 10/1994 | Little et al. | 705/2 |
| 5,448,729 | 9/1995 | Murdock | 707/104 |

OTHER PUBLICATIONS

Rosenthal; "Improving Managed Care: Employers and HMOs Can Bolster Their Relationships"; *Business Insurance*; Dec. 27, 1993; p. 23; Dialog: File 16, Acc#04859651.

*Primary Examiner*—Stephen R. Tkacs
*Attorney, Agent, or Firm*—Morgan, Lewis & Bockius LLP

[57] ABSTRACT

A health and welfare benefit enrollment and billing system and method, wherein a least one person is enrolled in at least one health and welfare benefit plan provided by at least one health and welfare benefit plan provider and a bill is generated for fees due to the at least one health and welfare benefit plan provider as a result of the enrollment of the at least one person in the at least one health and welfare benefit plan.

30 Claims, 12 Drawing Sheets

EXAMPLE COMPANY, INC.
ENROLLMENT FORM FOR "BIG CHOICE" BENEFITS PLAN - 1996
UNUM POLICY #501310

| | | | |
|---|---|---|---|
| NAME: | SARAH SHAN | SOCIAL SECURITY #: | DATE OF BIRTH: 9-7-1948 |
| ADDRESS: | 100 VALLEY ROAD | ANNUAL SALARY: $39, 728.00 | DATE OF HIRE: 4-5-1993 |
| | UPPER GULPH, PA 19080 | FULL-TIME | EFFECTIVE DATE: 3-1-1996 |
| | | LOCATION: 1 | DIVISION: 002 |

COSTS AND CREDITS ARE ON A BI-WEEKLY PAYROLL BASIS (26 PAYCHECKS PER YEAR). YOUR FLEX CREDITS ARE $ 53.22 PER PAYCHECK.

CHECK THE ELECTIONS YOU CHOOSE TO ENROLL IN AND ENTER THE AMOUNT ON THE LINE PROVIDED. IF THIS FORM IS NOT RETURNED TO YOUR EMPLOYER BY THE END OF THE ENROLLMENT PERIOD, YOU WILL BE ENROLLED IN THE NO CHOICE PLAN WITH COVERAGES AS FOLLOWS: MEDICAL OPTION G, EMPLOYEE ONLY; DENTAL AND VISION OPTION B, EMPLOYEE ONLY; LIFE/AD&D OPTION B; AND LTD OPTION A.

MEDICAL - BI-WEEKLY COST            YOUR COST $ _____

CHECK ONE ⟶

| | OPTION | DESCRIPTION | EMPLOYEE ONLY | EMPLOYEE + CHILDREN | EMPLOYEE + SPOUSE | EMPLOYEE + FAMILY |
|---|---|---|---|---|---|---|
| ☐ | A | OPT OUT | $0.00 | 0.00 | 0.00 | 0.00 |
| ☐ | B | USHC-NJ ($2) | $32.91 | $108.90 | $117.30 | $231.70 |
| ☐ | C | USHC-NJ ($10) | $23.10 | $96.90 | $103.90 | $212.30 |
| ☐ | D | USHC-PA ($2) | $28.20 | $97.20 | $105.90 | $194.90 |
| ☐ | E | USHC-PA ($20) | $23.10 | $87.70 | $94.70 | $180.00 |
| ☐ | F | VNA PLAN I - $200 DEDUCTIBLE | $29.60 | $108.90 | $117.30 | $213.24 |
| ☐ | G | VNA PLAN II - $300 DEDUCTIBLE | $23.10 | $76.90 | $83.90 | $182.30 |
| ☐ | H | VNA PLAN III - $500 DED./NO PCS CARD | $20.80 | $23.10 | $30.00 | $34.60 |
| ☐ | I | AMERIHEALTH-NJ ($2) | $29.60 | $101.98 | $112.68 | $213.24 |
| ☐ | J | BLUE-NJ ($10) | $23.10 | $96.90 | $103.90 | $212.30 |
| ☐ | K | AMERIHEALTH-NJ ($10) | $23.10 | $96.90 | $103.90 | $212.30 |
| ☐ | L | KEYSTONE-PA ($2) | $28.20 | $97.20 | $105.90 | $194.90 |
| ☐ | M | KEYSTONE-PA ($10) | $23.10 | $87.70 | $94.70 | $180.00 |

PAID DAYS OFF (PDO) PART TIME NON-BENEFIT EMPLOYEES, CHHA'S    _____ X $4.60 = _____
                    & FFS EMPLOYEES ARE NOT ELIGIBLE              PDO           CREDIT

YOU MAY EXCHANGE UP TO 5 PDO CREDITS. THIS CREDIT WILL BE USED TO OFFSET COSTS OF BENEFITS. YOU WILL RECEIVE $4.60 PER PAYCHECK FOR EACH PDO. ADD THIS AMOUNT TO YOUR CREDIT BELOW

CHECK ONE

| | OPTION | DESCRIPTION |
|---|---|---|
| ☐ | A | KEEP PDO THE SAME |
| ☐ | B | 1 TO 5 PAID DAYS OFF |

SARAH SHAN (1996)    COPYRIGHT (C) 1995, BY HR PARTNERS, LLP. ALL RIGHTS RESERVED    PAGE 1

*FIG. 7a*

| DENTAL | | | | YOUR COST $ _____ |
|---|---|---|---|---|
| CHECK ONE → | | | ☐ | ☐ |
| ↓ OPTION | DESCRIPTION | | EMPLOYEE ONLY | EMPLOYEE + FAMILY |
| ☐ A | OPT OUT | | $0.00 | $0.00 |
| ☐ B | NJHA-DENTAL | | $1.80 | $7.80 |

| VISION | | | | YOUR COST $ _____ |
|---|---|---|---|---|
| CHECK ONE → | | | ☐ | ☐ |
| ↓ OPTION | DESCRIPTION | | EMPLOYEE ONLY | EMPLOYEE + FAMILY |
| ☐ A | OPT OUT | | $0.00 | $0.00 |
| ☐ B | VISION SERVICE PLAN | | $0.20 | $3.90 |

| LIFE / AD&D (YOU MUST CHOOSE AN OPTION) | | | YOUR COST $ _____ |
|---|---|---|---|
| CHECK ONE | | | |
| ↓ OPTION | DESCRIPTION | VOLUME | COST |
| ☐ A | 1 X SALARY | $40,000.00 | $4.89 |
| ☐ B | 2 X SALARY | $80,000.00 | $9.78 |
| ☐ C | 3 X SALARY | $120,000.00 | $14.68 |
| ☐ D | $50,000 | $50,000.00 | $6.12 |

NOTE: LIFE INSURANCE VOLUME IN EXCESS OF $250,000 OR BASED ON AN INCREASE IN YOUR ELECTION AFTER INITIAL ENROLLMENT WILL NOT BE EFFECTIVE UNTIL EVIDENCE OF INSURABILITY IS APPROVED BY UNUM.

| DISABILITY (YOU MUST CHOOSE AN OPTION) | | YOUR COST $ _____ |
|---|---|---|
| CHECK ONE | | |
| ↓ OPTION | DESCRIPTION | COST |
| ☐ A | 50% TO $3,000 | $18.34 |
| ☐ B | 60% TO $6,000 | $22.92 |

| HEALTH CARE REIMBURSEMENT ACCOUNT | | | |
|---|---|---|---|
| CHECK ONE ($3,000 ANNUAL MAXIMUM) | | | |
| ↓ OPTION | DESCRIPTION | | |
| ☐ A | NO CONTRIBUTION | | |
| ☐ B | AMOUNT PER PAY PERIOD | $ _____ | EQUALS PER PAY PERIOD $ _____ |

SARAH SHAN (1996)     PAGE 2

FIG. 7b

```
┌─────────────────────────────────────────────────────────────────────────┐
│ DEPENDENT CARE REIMBURSEMENT ACCOUNT                                    │
│         ($5,000 ANNUAL MAXIMUM)                                         │
│ CHECK ONE                                                               │
│   ↓                                                                     │
│      OPTION      DESCRIPTION                                            │
│                                                                         │
│   ☐   A          NO CONTRIBUTION                                        │
│   ☐   B          AMOUNT PER PAY PERIOD  $_____ EQUALS PER PAY PERIOD $__│
└─────────────────────────────────────────────────────────────────────────┘

┌─────────────────────────────────────────────────────────────────────────┐
│                   TOTAL AMOUNT OF ELECTIONS: _____                     │
│                   FLEX CREDITS PROVIDED TO YOU:   $53.22                │
│              ADDITIONAL PDO CREDIT FROM ABOVE: _____                   │
│        PRE-TAX SALARY INCREASE/DECREASE AMOUNT: _____                  │
└─────────────────────────────────────────────────────────────────────────┘

┌─────────────────────────────────────────────────────────────────────────┐
│ DEPENDENT LIFE COVERAGE IS ON AN AFTER TAX BASIS                        │
│ SPOUSE LIFE    EMPLOYEE MUST HAVE LIFE INSURANCE OF $20,000  YOUR COST $__│
│                OR MORE IN ORDER TO SELECT THIS OPTION.                  │
│ CHECK ONE                                                               │
│   ↓                                                                     │
│      OPTION      DESCRIPTION         AGE BANDS         COST             │
│   ☐   A          NO COVERAGE            -              $0.00            │
│   ☐   B          $10,000              0  - 24          $0.74            │
│                                       25 - 29          $0.51            │
│                                       30 - 34          $0.60            │
│                                       35 - 39          $0.78            │
│                                       40 - 44          $1.15            │
│                                       45 - 49          $2.03            │
│                                       50 - 54          $3.69            │
│                                       55 - 59          $5.91            │
│                                       60 - 64          $6.69            │
│                                       65 - 69          $11.12           │
│                                       75 - 74          $30.32           │
└─────────────────────────────────────────────────────────────────────────┘

┌─────────────────────────────────────────────────────────────────────────┐
│ CHILD LIFE   COST IS TO COVER ALL OF YOUR CHILDREN   YOUR COST $_____│
│ CHECK ONE                                                               │
│   ↓                                                                     │
│      OPTION      DESCRIPTION                                            │
│   ☐   A          NO COVERAGE                         $0.00              │
│   ☐   B          $2,000 COVERAGE                     $0.12              │
└─────────────────────────────────────────────────────────────────────────┘

┌─────────────────────────────────────────────────────────────────────────┐
│                   TOTAL AFTER TAX COST: _____                          │
└─────────────────────────────────────────────────────────────────────────┘

SARAH SHAN (1996)                                                  PAGE 3
```

FIG. 7c

| DEPENDENT INFORMATION | COMPLETE THE FOLLOWING FOR THOSE DEPENDENTS TO BE COVERED BY YOUR ELECTION | | | | | | | |
|---|---|---|---|---|---|---|---|---|
| | | | | | COVERAGE APPLIED FOR | | | |
| NAME | SOCIAL SECURITY # | DATE OF BIRTH | RELATION TO YOU * | STATUS ** | MED | DEN | LIFE | VIS |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |
| ___ | ___ | ___ | ___ | ___ | ___ | ___ | ___ | ___ |

* RELATION TO YOU: SP = SPOUSE; CH = CHILD; ST = STEPCHILD WHO LIVES WITH YOU AND DEPENDS UPON YOUR FINANCIAL SUPPORT.

** STATUS: (COMPLETE IF APPLICABLE): S = FULL TIME STUDENT 19-25 (IF CHILD); H = HANDICAPPED PERSON; D = TOTALLY DISABLED PERSON (MAY BE SUBJECT TO A DELAYED EFFECTIVE DATE); N = NOT APPLICABLE.

BENEFICIARY INFORMATION    DESIGNATE YOUR LIFE INSURANCE BENEFICIARY(IES) BELOW

| NAME OF BENEFICIARY (LAST NAME, FIRST, MIDDLE INITIAL) | RELATION TO YOU | BENEFIT PERCENT |
|---|---|---|
| ___ | ___ | ___ |
| ___ | ___ | ___ |
| ___ | ___ | ___ |

CONTINGENT BENEFICIARY(IES)

| | | |
|---|---|---|
| ___ | ___ | ___ |
| ___ | ___ | ___ |
| ___ | ___ | ___ |

SARAH SHAN (1996)

FIG. 7d

DELAYED EFFECTIVE DATE;
(1) FOR THE EMPLOYEE - YOUR INSURANCE WILL BE DELAYED IF YOU ARE NOT IN ACTIVE EMPLOYMENT BECAUSE OF AN INJURY, SICKNESS, LEAVE OF ABSENCE OR TEMPORARY LAY-OFF ON THE DATE THAT INSURANCE WOULD OTHERWISE HAVE BECOME EFFECTIVE.
(2) FOR DEPENDENTS - INSURANCE WILL BE DELAYED IF A DEPENDENT IS TOTALLY DISABLED ON THE DATE THAT INSURANCE WOULD OTHERWISE BE EFFECTIVE. EXCEPTION: NEWBORN CHILDREN ARE INSURED FROM LIVE BIRTH.

---

YOU MUST COMPLETE THIS SECTION IF YOU OR AN ELIGIBLE DEPENDENT HAVE OTHER MEDICAL COVERAGE.

EMPLOYER SPONSORING THE PLAN: _____

NAME OF INSURANCE CARRIER: _____

IN ADDITION, I CERTIFY THAT ANY PERSON(S) WHOM I HAVE NOT ENROLLED IN THIS GROUP MEDICAL PLAN ARE INSURED BY OTHER GROUP INSURANCE AS SHOWN ABOVE.

---

YOU MUST COMPLETE THIS SECTION IF YOU OR AN ELIGIBLE DEPENDENT HAVE OTHER DENTAL COVERAGE.

EMPLOYER SPONSORING THE PLAN: _____

NAME OF INSURANCE CARRIER: _____

IN ADDITION, I CERTIFY THAT ANY PERSON(S) WHOM I HAVE NOT ENROLLED IN THIS GROUP DENTAL PLAN ARE INSURED BY OTHER GROUP INSURANCE AS SHOWN ABOVE.

---

EMPLOYEE'S SIGNATURE AND ACKNOWLEDGMENT OF BINDING EFFECT OF BENEFIT ELECTIONS (PLEASE READ CAREFULLY, THEN DATE AND SIGN WHERE INDICATED BELOW).

I UNDERSTAND THAT BY SIGNING AND SUBMITTING THIS FORM, I AM MAKING A BINDING ELECTION FOR MY BENEFITS AND I AM AUTHORIZING CORRESPONDING DEDUCTIONS FROM MY EARNINGS.

I UNDERSTAND THAT I CANNOT CHANGE MY ELECTIONS DURING THE PLAN YEAR (TO ADD, DROP OR CHANGE BENEFITS) UNLESS I EXPERIENCE A FAMILY STATUS CHANGE (SUCH AS MARRIAGE, DIVORCE OR BIRTH OF A CHILD).

IF FOR ANY REASON I FAIL TO COMPLETE A NEW ENROLLMENT FORM EACH PLAN YEAR, THE ELECTIONS MADE ON THIS FORM WILL BE CARRIED OVER AND REMAIN IN EFFECT (UNCHANGED) IN THE SUBSEQUENT YEAR(S), ALTHOUGH THE BENEFIT COSTS (AND PAYROLL DEDUCTIONS) MAY CHANGE.

DATE: _____ SIGNATURE: _____

SARAH SHAN (1996)   PAGE 5

FIG. 7e

CONFIRMATION OF BENEFIT ELECTIONS - 1996
EXAMPLE COMPANY, INC.
UNUM POLICY #501310   (BASED ON 26 PAYCHECKS PER YEAR)

NAME:     SARAH SHAN           FULL-TIME                    SS #:
ADDRESS:  100 VALLEY ROAD      LOCATION: 1                  BIRTH DATE: 9/7/48
          UPPER GULPH PA 19080 DIVISION:    002             SALARY: $39,728.00
                               ENROLLMENT AS OF: 2/1/96     HIRE DATE: 4/5/93

THESE ARE THE BENEFIT OPTIONS YOU HAVE SELECTED FOR THE PLAN YEAR JANUARY 1, 1996 THROUGH DECEMBER 31, 1996. YOU MUST BE ACTIVELY AT WORK ON THE EFFECTIVE DATE FOR COVERAGE TO BEGIN.

| BENEFIT | | EFFECTIVE | OPTION | COST |
|---|---|---|---|---|
| MEDICAL | USHC-NJ ($10) | 2/1/96 | C: EMPLOYEE + FAMILY | $212.30 |
| PAID DAYS OFF | | 2/1/96 | 0 | $0.00 |
| DENTAL | NJHA-DENTAL | 2/1/96 | B: EMPLOYEE + FAMILY | $7.80 |
| VISION CARE | OPT OUT | 2/1/96 | A: (NONE) | $0.00 |
| LIFE/ACCIDENTAL DEATH & DISMEMBERMENT* | | 2/1/96 | A: $40,000.00 | $4.89 |
| UPON APPROVAL, YOUR COVERAGE WILL BECOME B: $80,000.00 AT A COST OF $9.78. SEE NOTE BELOW. | | | | |
| LONG TERM DISABILITY | | 2/1/96 | B | $22.92 |
| HEALTH CARE REIMBURSEMENT | | 2/1/96 | A | $0.00 |
| DEPENDENT CARE REIMBURSEMENT | | 2/1/96 | A | $0.00 |
| YOUR TOTAL BI-WEEKLY PRE-TAX ELECTIONS | | | | $247.91 |
| CREDITS AVAILABLE | | | | $53.22 |
| YOUR TOTAL BI-WEEKLY PRE-TAX SALARY REDUCTION | | | | $194.69 |

| SPOUSE LIFE | 2/1/96 | A | $0 | $0.00 |
|---|---|---|---|---|
| CHILD LIFE | 2/1/96 | B | $2,000 | $0.12 |
| YOUR TOTAL BI-WEEKLY POST-TAX SALARY REDUCTION | | | | $0.12 |

THE AMOUNTS SHOWN ARE ALL SUBJECT TO ALL LIMITATIONS/EXCLUSIONS IN YOUR CERTIFICATE OF COVERAGE.

* NOTE: LIFE INSURANCE VOLUME IN EXCESS OF $250,000 OR BASED ON AN INCREASE IN YOUR ELECTION AFTER INITIAL ENROLLMENT WILL NOT BE EFFECTIVE UNTIL EVIDENCE OF INSURABILITY IS APPROVED BY UNUM.

DEPENDENTS TO BE COVERED:

| NAME | SS# | DOB | RELATION | COVERAGE(S) |
|---|---|---|---|---|
| RANDOLPH SHAN | | 2/5/44 | SPOUSE | |
| ANDREW SHAN | | 9/16/80 | CHILD | |
| CHLORYS SHAN | | 6/21/79 | CHILD | |
| MIKE SHAN | | 6/21/79 | CHILD | |

IF THE ABOVE DOES NOT AGREE WITH YOUR RECORDS,
PLEASE CONTACT DENISE DUBOISE AT UNUM AT (800) 421-0344

IF YOU AGREE WITH THE INFORMATION, PLEASE ATTACH THIS PAGE TO YOUR CERTIFICATE OF COVERAGE. THE INSURANCE OPTIONS ABOVE THEN BECOME PART OF YOUR CERTIFICATE OF COVERAGE.
DATE:   2/12/96    COPYRIGHT (C) 1995, BY HR PARTNERS, LLP. ALL RIGHTS RESERVED.

*FIG. 8*

HEALTH AND WELFARE BENEFIT ENROLLMENT AND BILLING SYSTEM AND METHOD

AUTHORIZATION UNDER 37 C.F.R. § 1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a health and welfare benefit enrollment and billing system and method. While the invention is subject to a wide range of applications, it is especially suited for use in an employee/employer context and will be particularly described in that connection.

2. Description of the Related Art

All employers, regardless of size, who offer health and welfare benefits to their employees must enroll the employees in one or more benefit plans by having the employees fill out appropriate application forms for each benefit plan and by transmitting the completed application forms to the appropriate providers of such plans, must receive and pay bills for premiums and administrative fees charged by the plan providers, and must develop and transmit various information about each participating employee and his or her enrollment to the employee, the plan providers, and other interested parties. Even if an employer doesn't offer benefits in the form of a cafeteria or flexible benefit plan, employees must make choices about their benefits, such as whether to accept or "opt out" and whether to cover self only or to include one or more dependents. Furthermore, the characteristics, such as variable rates and amounts of coverage based on age and/or salary, of certain benefits, such as life and disability income insurance, must be individualized for each employee. If the benefit plan is a cafeteria or flexible benefit plan, then the choices and individual variation among employees is even greater. Such individual variations among participating employees makes it highly desirable, if not necessary, for enrollment forms to be customized for each employee on an individual basis.

Generally, employers have not computerized the process of enrolling employees in health and welfare benefit plans. Also, a growing number of employers utilize customized enrollment forms generated by outside consultants or service providers. While an increasing number of employers have computerized their payroll and/or human resource information systems, either internally or on an "out-sourced" basis, the information contained in and generated by these payroll and/or human resource information systems is not sufficient to generate the enrollment forms needed for health and welfare benefit plans. Further, such systems are not able to manage health and welfare benefit enrollment information, communicate the information to interested parties such as, for example, participating employees and plan providers, or produce the billings needed for each plan provider's premiums and/or fees. Such systems also fail to store and, therefore, are not able to retrieve certain information required to be reported to regulatory authorities such as, for example, the IRS and U.S. Department of Labor. Hence, separate systems are maintained for performing these functions, ordinarily with independent data entry (even where the same data is needed by more than one system) and the attendant opportunities for inconsistency and human errors.

All health and welfare benefit plan providers, regardless of size, must receive enrollment information and application forms from participating employees. This enrollment information, once collected, is used to record enrollment details to substantiate entitlement to the specific benefits selected and to generate billing of premiums and/or administrative fees payable by the employer.

Virtually all plan providers have computerized their systems for recording and maintaining enrollment and benefit entitlement information for participating employees. And, virtually all plan providers have computerized their systems for calculating premiums due and issuing bills to the employers of the participating employees. However, the current state of the art is for each plan provider to maintain two separate systems; one for enrollments and the other for billing. Although both systems utilize much of the same information, the information is entered separately (typically by keyboard entry) into each system. This time-consuming duplication of data entry is wasteful and also gives rise to inconsistencies of human error.

Furthermore, plan providers have not standardized their enrollment application forms, nor the information needed about participating employees and dependents. Thus, each plan provider uses its own application forms and has its own requirements for information needed to enroll employees and their dependents into a specific benefit plan, and employees are required to fill out several different forms, such as a medical insurance application form, a dental insurance application form, a life insurance application and/or beneficiary designation form, a disability insurance application form, with overlapping information. As a result, there is more time wasted by employers and employees to implement and administer health and welfare benefit plans. In addition to wasted time, there is more opportunity for human error by an employee providing inconsistent information on each form and the employer wastes even more time double checking the forms and distributing them to the appropriate plan providers. Information from each form is then keyed into different enrollment and separate billing systems by each plan provider, thereby multiplying time wasting duplication of effort and more opportunities for human error in the re-keying of information.

SUMMARY OF THE INVENTION

Accordingly, the present invention is directed to a health and welfare benefit enrollment and billing system and method that substantially obviate one or more of the problems due to the limitations and disadvantages of the related art.

Additional features and advantages of the invention will be set forth in the description which follows, and in part will be apparent from the description, or may be learned by practice of the invention. The objectives and other advantages of the invention will be realized and attained by the system and method particularly pointed out in the written description and claims hereof as well as the appended drawings.

To achieve these and other advantages and in accordance with the purpose of the invention, as embodied and broadly described, the invention provides for a health and welfare benefit enrollment and billing system comprising enrolling means for enrolling at least one person in at least one health and welfare benefit plan provided by at least one health and welfare benefit plan provider, and bill generating means for generating a bill for fees due to the at least one health and welfare benefit plan provider as a result of the enrollment of the at least one person in the at least one health and welfare benefit plan.

To further achieve these and other advantages and in accordance with the purpose of the invention, as embodied and broadly described, the invention also provides for a health and welfare benefit enrollment and billing method comprising the steps of entering data into one of a single computerized database management system and a plurality of interconnected computerized database management systems, enrolling at least one person in at least one health and welfare benefit plan provided by at least one health and welfare benefit plan provider in accordance with the data entered into the one of the single computerized database management system and the plurality of interconnected computerized database management systems, and generating a bill for fees due to the at least one health and welfare benefit plan provider as a result of the enrollment of the at least one person in the at least one health and welfare benefit plan in accordance with the data entered into the one of the single computerized database management system and the plurality of interconnected computerized database management systems.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate one embodiment of the invention and together with the written description serve to explain the principles of the invention. In the drawings:

FIGS. 7a–7e are an example of a blank enrollment form generated by the health and welfare benefit enrollment and billing system of FIG. 1; and FIG. 8 is an example of a confirmation generated by the health and welfare benefit enrollment and billing system of FIG. 1.

DETAILED DESCRIPTION OF THE PREFERRED EMBODIMENTS

Reference will now be made in detail to the present preferred embodiments of the invention, an example of which is illustrated in the accompanying drawings. For the purposes of this invention, "health and welfare benefit plan" means any type of benefit plan, whether or not insured, for providing health and/or welfare benefits to an individual or a group or groups of individuals, including but not limited to medical benefit plans, dental benefit plans, cafeteria or flexible benefit plans, disability benefit plans, life insurance benefit plans, vision benefit plans, prescription drug benefit plans, long term care insurance benefit plans, payroll deduction universal life insurance benefit plans, and combinations thereof, and "plan year" means either the fiscal or calendar year or other interval of time used for indicating a health and welfare benefit plan cycle. Also for the purposes of this invention, "health and welfare benefit plan provider" or "plan provider" means any individual or entity that provides one or more health and welfare benefit plans to an individual or a group or groups of individuals or that provides administrative or other services to such plans, including but not limited to insurance companies, health maintenance organizations (HMOs), prescription drug providers, third party administrators (TPAs), and combinations thereof.

Figure 1:
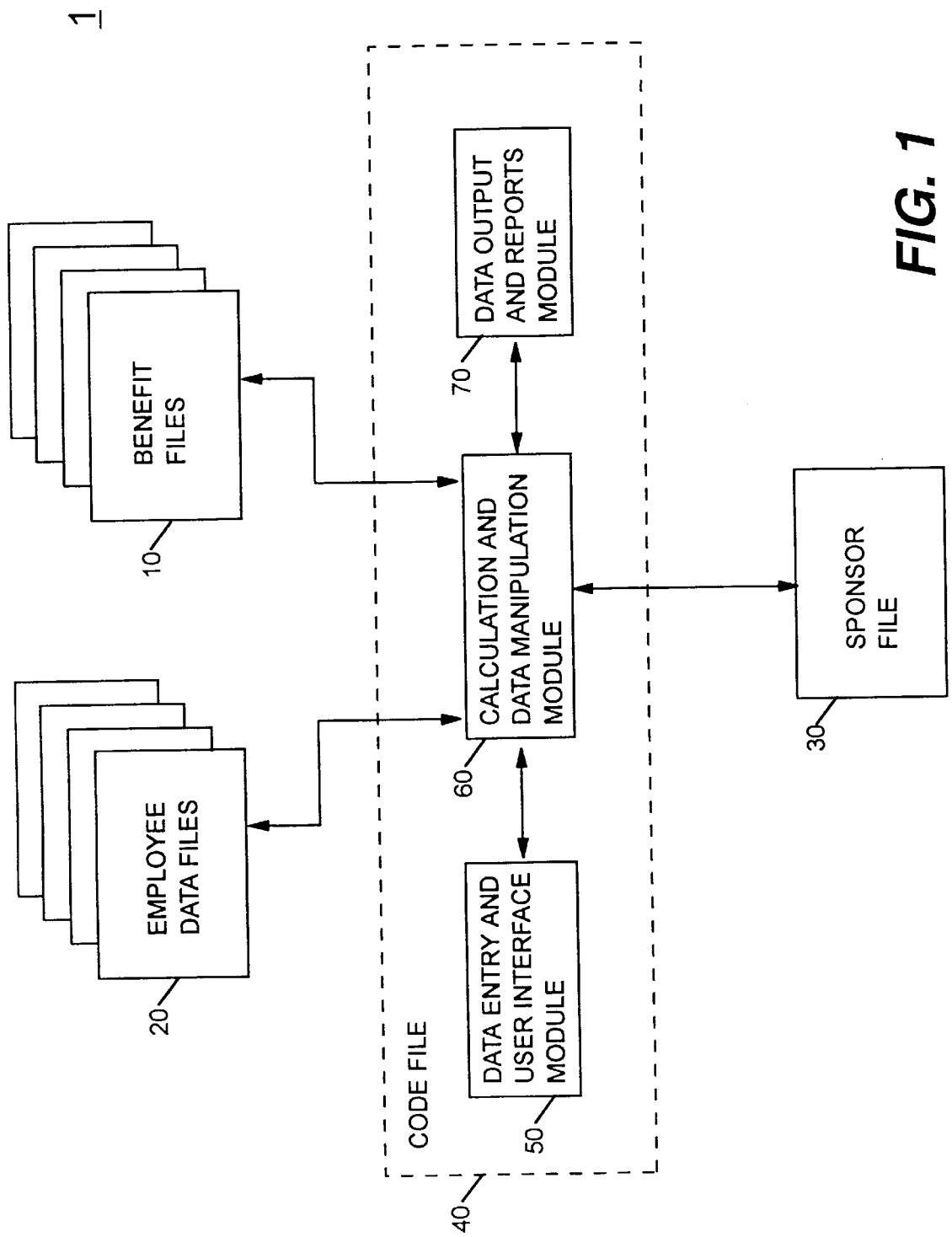
FIG. 1 is a block diagram of a preferred embodiment of a health and welfare benefit enrollment and billing system according to the present invention.

An exemplary embodiment of the health and welfare benefit enrollment and billing system of the present invention is shown in FIG. 1 and is designated generally by reference numeral 1. As shown in FIG. 1, the health and welfare benefit enrollment and billing system 1 comprises a plurality of benefit files 10, a plurality of employee data files 20, a sponsor file 30, and a code file 40. Preferably, these files are embodied by software and integrated as a single computerized database management system or a plurality of interconnected computerized database management systems. For example, the health and welfare benefit enrollment and billing system 1 can be created and operated using a commercially available operating system and database management software program, such as the Microsoft Windows™ operating system the Microsoft Access™ database management software. The health and welfare benefit enrollment and billing system 1 can be created and operated using other types of operating systems and database management software programs known in the art as well.

Each of the plurality of benefit files 10 is associated with one or more employees of a particular employer or subdivision of an employer, wherein each employee is subject to the same health and welfare benefit constraints (e.g., available plan choices and coverage options). It should be understood that while a plurality of benefit files are shown in FIG. 1, only one file is necessary for operation of the invention.

Further, each of the plurality of benefit files includes tables of information that describe the employer or subdivision of an employer, the employer's health and welfare benefit policies, the benefit plans in which the employer's employees can be enrolled, and the plan providers of such benefits. This information can include, for example, the benefit types and coverage options available to the employees for enrollment selection, identification of which benefits are employee selectable and which are attached to other employee selections (e.g., which medical plans include a separate prescription card and which do not), identification of plan features that generate cost or premium billings based on other employee selections but are not benefits disclosed to or payable to employees (e.g., stop loss insurance which protects the employer against excessive claims under self-insured plans), and identification of the financial characteristics of each benefit type and coverage option (e.g., premiums and/or expenses payable to the respective plan provider, prices charged to the employee electing benefits, whether such prices are a pre-tax or an after-tax payroll deduction, and any credits available to an employee who opts out of a particular benefit or selects a reduced level of benefits). It should be appreciated that additional or different information can be included in the benefit files as needed to accommodate different types of benefit plans or employer policies.

Figure 2:
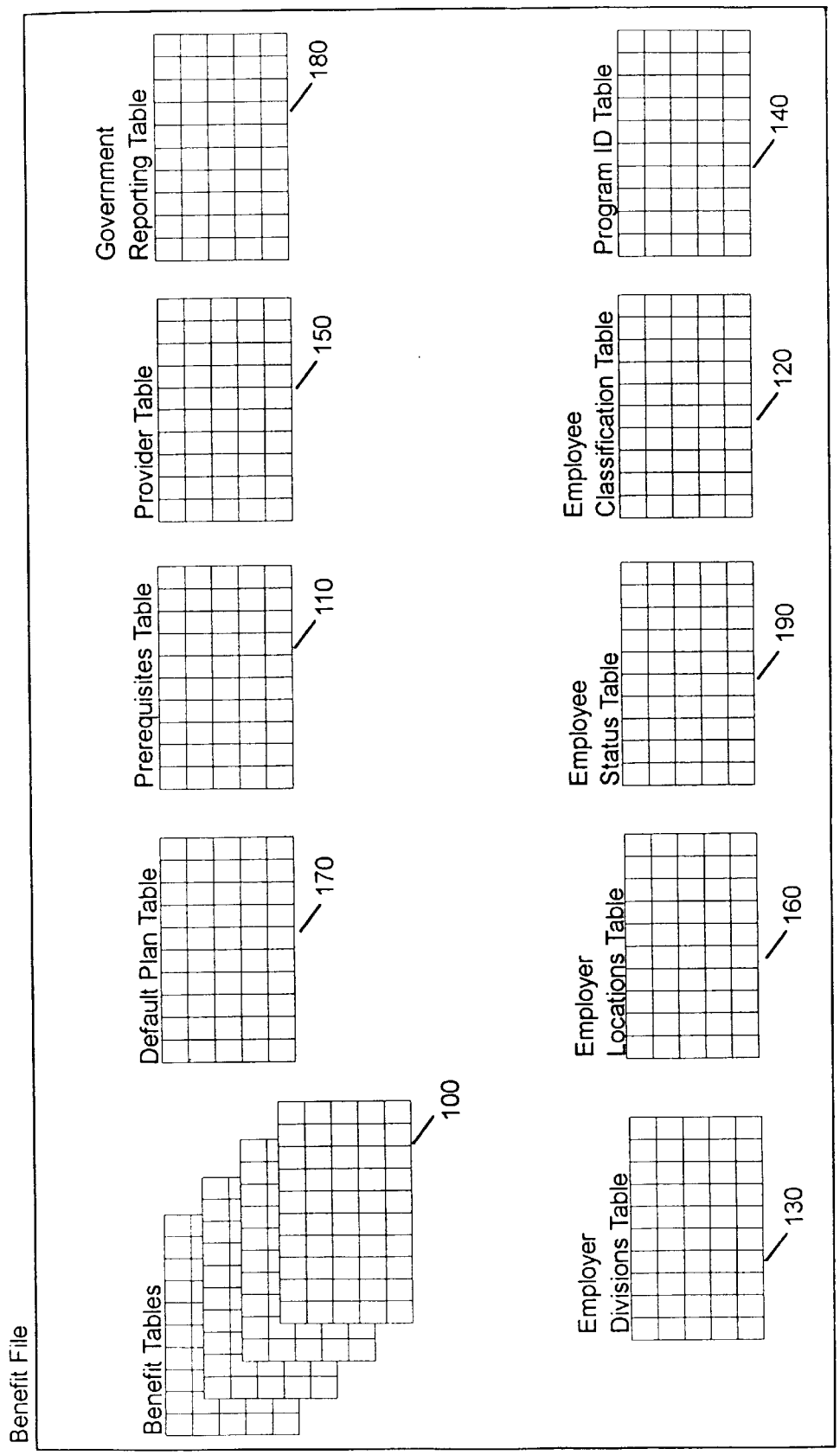
FIG. 2 is a block diagram of a benefit file of the health and welfare benefit enrollment and billing system of FIG. 1.

FIG. 2 illustrates a specific implementation of one of the benefit files 10. As shown in FIG. 2, the benefit file comprises a plurality of benefit tables 100, a prerequisites table 110, an employee classification table 120, an employer divisions table 130, a program ID table 140, a provider table 150, an employer locations table 160, a default plan table 170, a government reporting table 180, and an employee status table 190.

Each of the benefit tables 100 corresponds to a particular health and welfare benefit available to each employee associated with the benefit file and each describes all relevant information for that benefit. For example, a benefit table corresponding to a medical benefit could include the various medical benefit plans and coverage options available to the employee, the name of the provider of each benefit plan, the cost to the employee for selection of each coverage option of each benefit plan (preferably, employee costs are broken down by employee status and/or classification, both of which will be described below), the manner in which the employee is to be charged, if at all, for the benefit (e.g., via payroll deduction), whether payments by the employee are subject to withholding tax, the plan year or years for which the benefit is available, any credits available to the employee for electing not to obtain the benefit (or augmentation of compensation if total credits available exceed the total cost of the benefit), the premium, premium equivalent or fee (e.g., the actual amount due to the plan provider) associated with each coverage option of each benefit plan, and an IRS plan number (as required by IRS Form 5500) for each benefit plan. As another example, a benefit table corresponding to a life insurance (e.g., self, spouse, or child life insurance) or disability benefit could include, in addition to some or all of the information described above for the medical benefit table, minimum or maximum ages for receiving the benefit under each plan and a percentage of a maximum benefit available to the employee based upon, for example, the employee's age. As a further example, a benefit table corresponding to a flexible spending account (e.g., a dependent care or health care reimbursement account) benefit could include, again in addition to some or all of the information described above for the medical benefit table, maximum benefits available to the employee for each plan as well as a range of possible employee contributions for each plan. While examples of the types of information stored in the benefit tables 100 have been given, it should be appreciated that the information stored in each of the benefit tables 100 will depend on the particular benefit with which that table corresponds and can, therefore, be modified as needed to suit a particular application of the invention.

The default plan table 170 provides a list of default benefit plan and coverage option selections for each of the benefits described in the benefit tables 100. As will be explained in more detail below, these default selections or "no choice plans" are provided to employees who fail to select an available benefit plan on their own to ensure that those employees will have at least some minimum level of benefits. The default benefit plans and coverage options included in the default plan table 170 can be determined, for example, by the employer.

The prerequisites table 110 stores information describing which benefit plans, if any, described in the benefit tables 100 have prerequisites that must be met before an employee can be enrolled in the plans. For example, certain life insurance plans require evidence of insurability of an employee to be approved by the plan provider before the employee is eligible to receive the chosen benefit or level of coverage. In this example, the prerequisites table 110 could store information describing the conditions under which evidence of insurability is required by the plan provider (e.g., when the employee desires to receive an initial life insurance face amount over $250,000 or to increase his or her life insurance election after initial enrollment, such as from 2 to 3 times salary).

The provider table 150 includes a list of each benefit plan provider described in the benefit tables 100 as well as all relevant information concerning each benefit plan provider. Such information could include, for example, each benefit plan provider's name and billing address, application information required by each plan provider to enroll an employee and/or the employee's dependents in the provider's benefit plan, and each plan provider's billing and reporting requirements (e.g., format and means of transmission of bills and reports). Again, the contents of the provider table 150 can be modified as needed to suit a particular application of the invention.

The government reporting table 180 includes, for each of the benefit plans described in the benefit tables 100, information required by various government agencies, such as the IRS or Department of Labor, to meet any reporting requirements. For example, the government reporting table 180 could include information, such as plan number, name, address and telephone number of the plan administrator, type of plan benefits, and plan funding method, that would enable the health and welfare benefit enrollment and billing system 1 to generate IRS Form 5500 or generate information necessary for others to prepare IRS Form 5500.

The employer divisions table 130 includes a list of the various divisions, if any, of the employer associated with the benefit file. For each division, the employer divisions table 130 also includes all relevant information for the division, such as the name of the division, the name of a contact person responsible for handling health and welfare benefit enrollment and billing for the division, the address of the division, and the telephone and facsimile numbers of the contact person.

The employer locations table 160 is similar to the employer divisions table 130. However, the employer locations table 160 includes a list of all relevant information for the various locations of the employer associated with the benefit file at which participating employees are located or to which employees report or are assigned, as opposed to the divisions. It should be noted that other subgroups of the employer can be identified to suit a particular application of the invention.

The employee status table 190 includes a list of all possible employment statuses for the employees of the employer associated with the benefit file. For example, the employee status table 190 could include one or more of the following statuses: active, terminated, or disabled. It should be noted that additional or different statuses could be included in the employee status table 190 to suit a particular application of the invention.

The employee classification table 120 includes a list of all possible job classifications for the employees of the employer associated with the benefit file. For example, the employee classification table 120 could include one or more of the following classifications: executive, manager, or clerical. Again, additional or different job classifications could be included in the employee classification table 120 to suit a particular application of the invention.

The program ID table 140 identifies with what version of the code file 40 (FIG. 1) the benefit file is compatible. The purpose of the program ID table 140 is to inform the code file 40 whether it can access the benefit file without risking the integrity of the benefit file. This is especially useful when more than one version of the code file 40 is being used by the same employer or shared among different employers.

Referring back to FIG. 1, each of the plurality of employee data files 20 corresponds to a specific one of the plurality of benefit files 10 and, therefore, is associated with one or more employees of a particular employer or subdivision of the employer, wherein each employee is subject to the same health and welfare benefit constraints. As was the case with the benefit files 10, while a plurality of employee data files 20 are shown in FIG. 1, only one file is necessary for operation of the invention.

Figure 3:
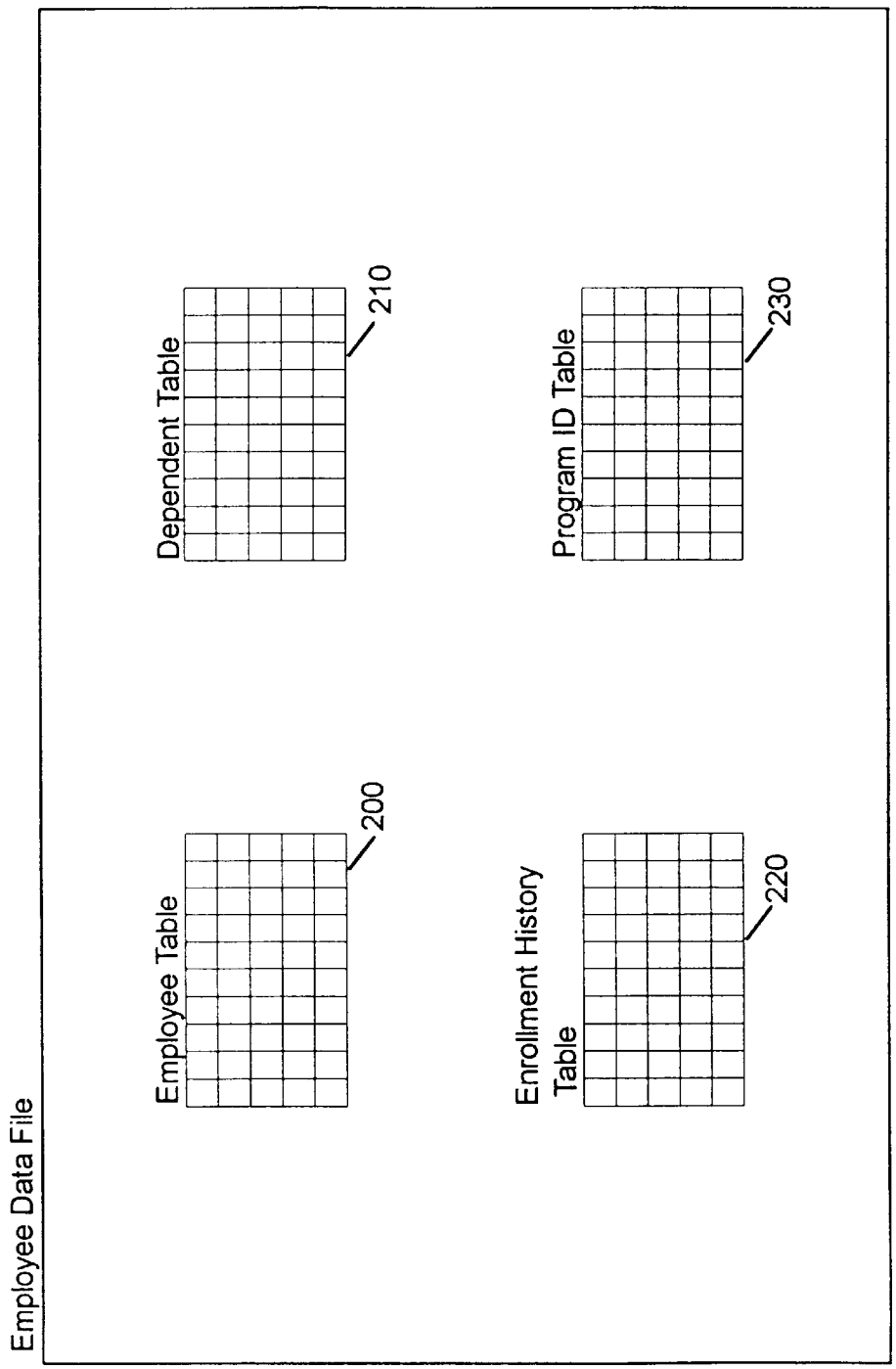
FIG. 3 is a block diagram of an employee data file of the health and welfare benefit enrollment and billing system of FIG. 1.

Further, each of the plurality of employee data files 20 includes tables of information that describe each employee of the employer or subdivision of the employer associated with the file as well as the employee's health and welfare benefit enrollment history. As shown in FIG. 3, a specific implementation of one of the employee data files 20 comprises an employee table 200, a dependent table 210, an enrollment history table 220, and a program ID table 230.

The employee table 200 describes, for each employee, the employee's social security number, date of birth, name, address, home telephone number, hire date, effective date for receiving benefits, work location and division, job classification, status, salary (for current, prior, and subsequent plan years), sex, and marital status. Other or different information concerning the employee can also be included in the employee table 200 to suit a particular application of the invention.

The dependent table 210 includes, for each dependent (if any) of each employee described in the employee table 200, the dependent's name, relation to the employee, date of birth, sex, marital status, and school name and graduation date (if appropriate). The dependent table 210 also describes what benefits each dependent will receive under the employee's benefit plan and coverage option selections, and whether any of the dependents obtain benefits under a benefit plan other than the employee's selected benefit plan, such as, for example, if a dependent is covered under two different health insurance plans. Again, other or different information concerning the dependents can be included in the dependent table 210 to suit a particular application of the invention.

The enrollment history table 220 maintains detailed historical records of each employee's benefit plan enrollment history for one or more plan years, such as the current plan year, the immediately preceding plan year, and the immediately following plan year. Each record could include, for example, an indication of whether the record is for the current, immediately preceding or immediately following plan year, and a detailed description of each of the benefit plans and coverage options in which the employee is, has been, or will be enrolled and the effective date of such enrollment. Preferably, a new record is stored in the enrollment history table 220 each time an employee modifies his or her enrollment status with respect to at least one benefit plan or changes other information stored in the enrollment history table 220, such as job classification or benefit eligibility status. Also, preferably, an employee can have only one active enrollment record at any given time.

The program ID table 210, like the program ID 140 table included in the benefit file of FIG. 2, identifies with what version of the code file 40 the employee data file is compatible. Again, the purpose of the program ID table 210 is to maintain the integrity of the employee data file.

Figure 4:
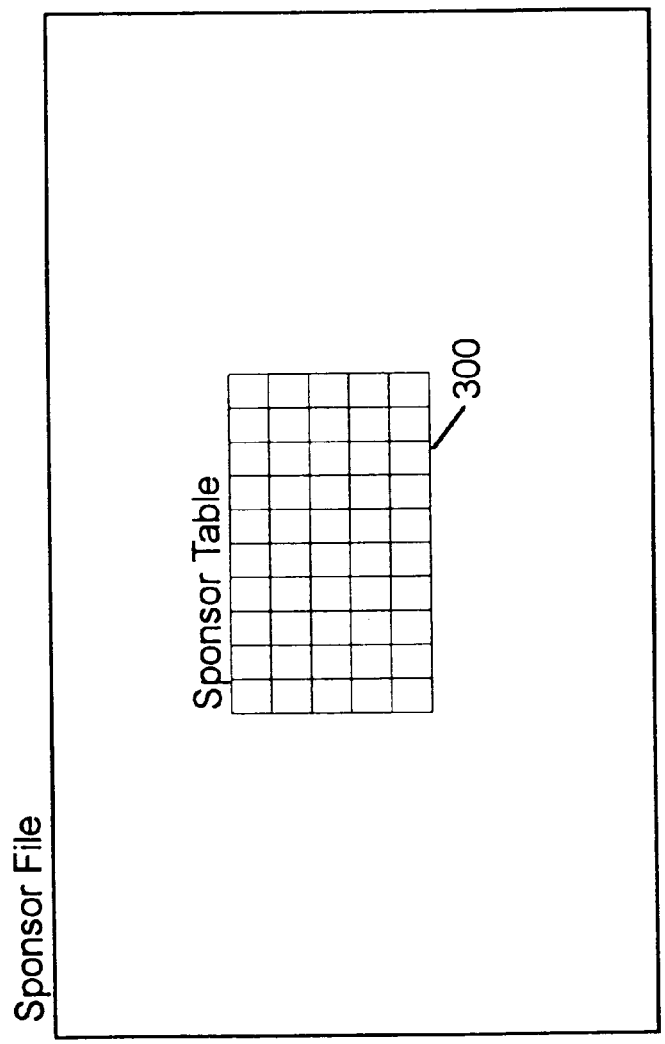
FIG. 4 is a block diagram of a sponsor file of the health and welfare benefit enrollment and billing system of FIG. 1.

Referring once again to FIG. 1, the sponsor file 30 includes certain information common to each of the benefit files 10 and employee data files 20 that is associated with each plan provider. The code file 40 uses this information to read, interpret, and manage the data stored in the benefit files 10 and employee data files 20. As shown in FIG. 4, in one specific implementation of the sponsor file 30, this information is stored in a sponsor table 300 which lists all employers or employer subdivisions whose benefits and employee data files are available to a particular user of the invention, and for each employer or employer subdivision lists information about the employee's employer, such as the current fiscal year of the particular benefit plan of the employer, the number of pay periods in the fiscal year, and the name, address and the federal EIN of the employer.

The code file 40 comprises a set of instructions by which the health and welfare benefit enrollment and billing system 1 operates. As shown in FIG. 1, these instructions are organized into a data entry and user interface module 50, a calculation and data manipulation module 60, and a data output and reports module 70.

The data entry and user interface module 50 enables a user of the health and welfare benefit enrollment and billing system 1 to enter, review, extract, and modify the data stored in the various files of the health and welfare benefit enrollment and billing system 1. Communication between the user and the data entry and user interface module 50 can performed manually (e.g., via keyboard, mouse, touchscreen, scanner, voice command, etc.), electronically (e.g., via modem, floppy disc, etc.), and/or any other technique known in the art. To facilitate this communication, the data entry and user interface module 50 generates menus and data entry screens. Preferably, these menus and data entry screens are specific to routine and repetitive functions performed by the user of the health and welfare benefit enrollment and billing system 1 and have built in certain knowledge of those functions. In this manner, the health and welfare benefit enrollment and billing system 1 can restrict the user's data entry in ways that help assure completeness of data entered and double check that formats are correct to thereby reduce incidence of human error. This technique is sometimes referred to in the art as "error-trapping."

The calculation and data manipulation module 60 performs calculations and data manipulations required to create various forms, reports, bills, and other outputs produced by the health and welfare benefit enrollment and billing system 1. The calculation and data manipulation module 60 performs this function according to specific rules many of which are variable and are stored in and referenced from the benefit files 10, employee data files 20, sponsor file 30, and code file 40. These rules describe, for example, which benefit costs are chargeable to employees on a pre-tax basis and which are chargeable on an after-tax basis, threshold levels under federal income tax laws for what amounts of employee and/or dependent group life insurance require charging the employee with imputed taxable income, appropriate IRS tables for calculating imputed taxable income chargeable with respect to such "excess" group life insurance, federal income tax law limitations on and methods for calculating permissible contributions by participating employees to flexible spending accounts, federal tax rules applicable for the calculation period regarding things such as the threshold amount(s) for determining excess insurance coverage, IRS rules for determining an employee's age for this purpose, and the IRS rate tables used to calculate imputed income created by such excess coverage, information indicating which benefit costs generate pre-tax payroll deductions and which generate after-tax payroll deductions, rules for calculating the employee's benefit credits, conversions of employee benefit price tags, credits, premiums and/or administrative fees between monthly and per pay period amounts, as needed to produce accurate forms, reports, bills and other outputs of the invention, price tags, premiums and credits per pay period for items that are dependent on an employee's age and salary, such as those associated with life insurance and disability income insurance, rules for determining an employee's age for insurance purposes, imputed income per pay period generated by life insurance coverage in excess of applicable IRS limitations, total after-tax payroll deductions per pay period for an employee based on his or her benefit elections and total pre-tax payroll deductions per pay period for an employee based on his or her benefit elections, and an employee's total benefit credits per pay period, if any.

The data output and reports module 70 places the forms, reports, bills, and other outputs created by the calculation and data manipulation module 60 into a desired format for transmission to employees, employers, plan providers, and/or other third parties (e.g., payroll and human resource personnel and/or systems). For example, the data output and reports module 70 can place forms, reports, bills, and other outputs into a suitable format for printing by a printer, storage by a memory device (e.g., floppy disc), or transmission by a facsimile or modem.

It should be appreciated that the foregoing organization of the various files and tables of the health and welfare benefit enrollment and billing system 1 provides for convenience of maintenance and facilitates use of the system for different employers or groups of employees with minimum duplication of computer codes. Nevertheless, the organization of these files and tables can be modified from that shown in FIGS. 1–4 in any manner known in the art.

Figure 5:
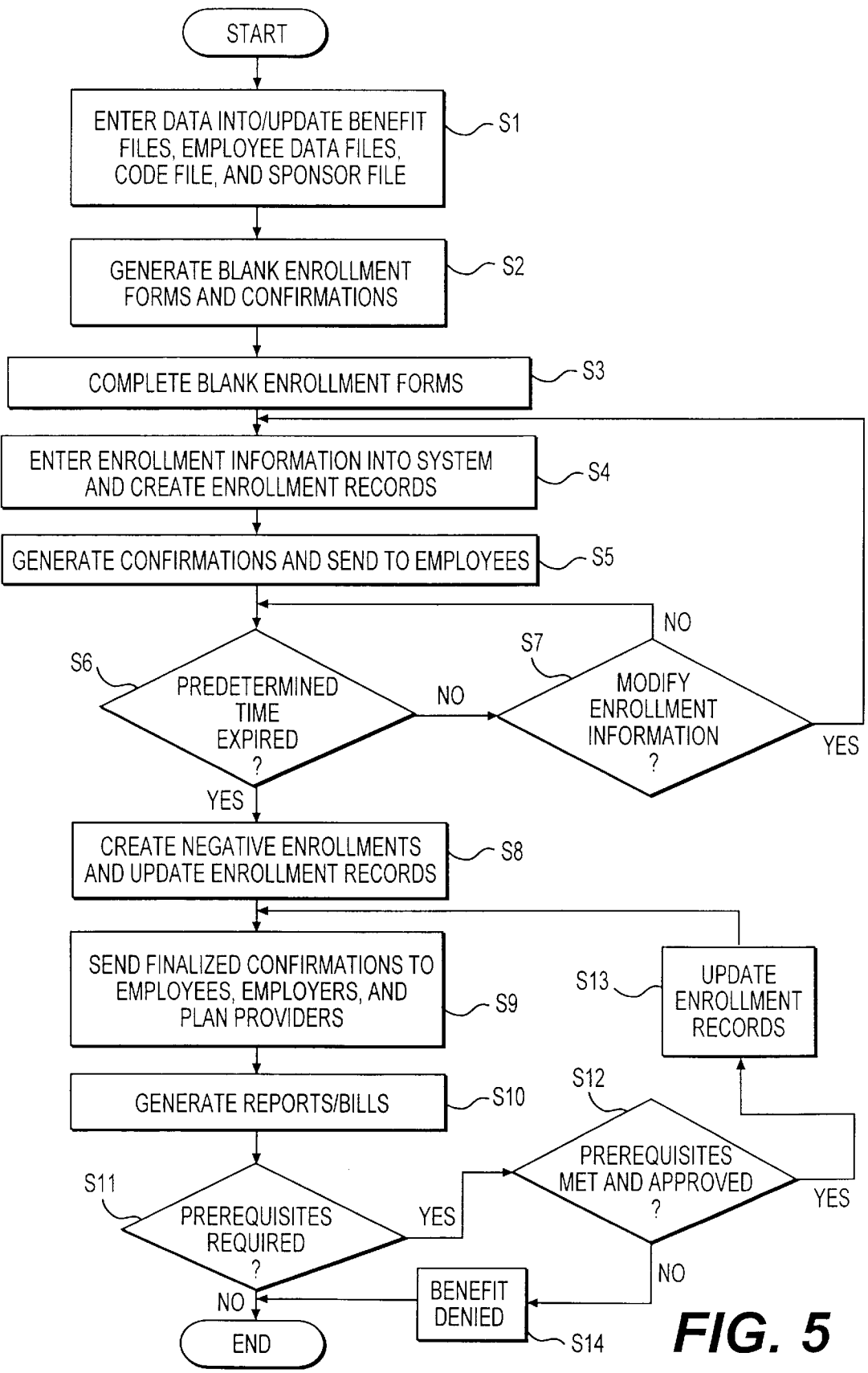
FIG. 5 is a flow diagram of an operation of the health and welfare benefit enrollment and billing system of FIG. 1.

Operation of the health and welfare benefit enrollment and billing system 1 will now be described with reference to the flow diagram of FIG. 5.

In step S1, appropriate data and instructions, as discussed above, are entered into the benefit files 10, the employee data files 20, the sponsor file 30, and the code file 40. The data and instructions can be entered by any number of entities including, for example, an employee, employer, benefit plan provider, or third party. For example, data for the employee data files 10 can be entered directly from the employer's payroll or human resource system. Similarly, data for the benefit files 20 can be entered by the benefit provider. Preferably, the benefit files 10, employee data files 20, sponsor file 30, and code file 40 are updated regularly (e.g., usually annually to reflect current premiums and other benefit features and options available for each plan year) to ensure the accuracy of the files over time.

In step S2, the health and welfare benefit enrollment and billing system 1 generates a blank enrollment form for each employee described in the employee data files 20 and eligible to receive one or more benefits. The blank enrollment forms are generated according to the data and instructions entered into the benefit files 10, the employee data files 20, the sponsor file 30, and the code file 40 in step S1 and are individualized for each employee to include, for example, all benefit plans and coverage options that are available to be selected by the employee as well as prices and credits (if any) associated with each benefit plan and coverage option. Again, the information included in each enrollment form can be based, for example, on relevant characteristics of the employee, such as job classification, division, work location, age and salary, and rules established by the employer. An example of a blank enrollment form is shown in FIGS. 7a–7e.

Preferably, along with the blank enrollment forms, the health and welfare benefit enrollment and billing system 1 also generates a confirmation of each employee's enrollment status including the employee's most recently effective benefit plan and coverage option selections (if any) for the same plan year in case of a mid-year change in employment status, or for the prior plan year in case of a request by the employee for an enrollment form for the next plan year (starting after the request date). Preferably, the confirmation is individualized for each employee. It should be appreciated that such a confirmation can assist an employee in making new benefit plan and coverage option selections and/or changing his or her existing selections. An example of such a confirmation is shown in FIG. 8.

Once generated, the blank enrollment forms and the confirmations are provided to the employees in a suitable format and by suitable means in accordance with the data and instructions entered into the benefit files 10, the employee data files 20, and the code file 40 in Step S1. For example, the forms and confirmations can be provided to the employees on paper, on computer diskette, via electronic file transfer, or by other means known in the art.

In step S3, each employee fills out his or her blank enrollment form or otherwise communicates the information requested in the blank enrollment form to his or her employer or appropriate administrator. It should be appreciated that each enrollment form, once completed by the employee, meets all the enrollment application requirements of each participating plan provider associated with the benefit plans included in the blank enrollment form. Thus, the employee need only complete a single enrollment form even when selecting multiple benefit plans and coverage options.

In step S4, for each employee, the information provided by the employee either in the completed enrollment form or otherwise is entered into the health and welfare benefit enrollment and billing system 1 in a suitable format and by suitable means in accordance with the data and instructions entered into the benefit files 10, the employee data files 20, and the code file 40 in Step S1. For example, if the completed enrollment form is on paper, the information can be entered into the health and welfare benefit enrollment and billing system 1 by keyboard entry or scanning. As the information is entered, the health and welfare benefit enrollment and billing system 1 generates a new enrollment record for the employee in the appropriate enrollment history table.

In step S5, the health and welfare benefit enrollment and billing system 1 generates a confirmation of each employee's enrollment status including benefit plan and coverage option selections and other relevant enrollment information for the employee, and again provides the confirmation to the employee in a suitable format and by suitable means in accordance with the data and instructions entered into the benefit files 10, the employee data files 20, and the code file 40 in Step S1. While the confirmation is generally provided only to the employee, it may also be provided to the employer and respective plan providers in which case the confirmation is preferably individualized not only for the employee, but for the employer and plan providers as well.

In steps S6 and S7, each employee is given a predetermined period of time during which the employee can modify the information indicated in the confirmation if, for example, the confirmation is inaccurate or the employee changes his or her mind concerning his or her benefit plan and/or coverage option selections. Preferably, each employee is given until the start of the plan year to make any such modifications. If an employee makes modifications to the information within the predetermined period of time, the modifications are entered into the health and welfare benefit enrollment and billing system 1 (step S4), the health and welfare benefit enrollment and billing system 1 appropriately adds a modified enrollment record for the employee in the enrollment history table (step S4), and the health and welfare benefit enrollment and billing system 1 generates a new confirmation and provides the new confirmation to the employee and/or the employer and plan providers (step S5). If, however, the employee fails to make any modifications to the information within the predetermined period of time, control passes to step S8.

In step S8, the health and welfare benefit enrollment and billing system 1 creates a "negative enrollment" for any employee who fails to select an available benefit plan or plans on his or her own within the predetermined period of time. Specifically, those employees who fail to submit timely benefit plan and coverage option selections for a specific plan year are automatically re-enrolled with their selections for the prior plan year. For those employees having no prior plan year selections, the employees are enrolled in the no choice plans. The health and welfare benefit enrollment and billing system 1 also appropriately adds an enrollment record for the employee in the enrollment history table.

In step S9, the health and welfare benefit enrollment and billing system 1 generates a finalized confirmation of each employee's benefit plan and coverage option selections and other relevant enrollment information. Preferably, the finalized confirmation is provided to the employee, the employer, and the respective plan providers, once again in a suitable format and by suitable means in accordance with the data and instructions entered into the benefit files 10, the employee data files 20, and the code file 40 in Step S1.

In step S10, the health and welfare benefit enrollment and billing system 1 generates various reports and bills desired by the employees, the employers, the plan providers, and other third parties. Preferably, for each of the employees, employers, plan providers, and other third parties, these reports and bills are individualized for the recipient and are provided, once again, in suitable formats and transmitted by suitable means in accordance with the data and instructions entered into the benefit files 10, the employee data files 20, and the code file 40 in step S1.

For example, the health and welfare benefit enrollment and billing system 1 can create a "Salary Impact Report" indicating for each employee and in total for each employer (and in subtotal for each of the employer's divisions, if any) the amount of pre-tax payroll deductions generated by each benefit selection for each participating employee, the total benefit credits available for the employee to offset the payroll deductions (or increase the employee's salary, if appropriate), and, in similar detail, any after-tax payroll deductions generated by each benefit for the participating employee. Preferably, the Salary Impact Report is distributed to the employer and/or the employer's payroll system and is generated regularly (e.g., for each payroll period determined specifically for each employer).

The health and welfare benefit enrollment and billing system 1 can also create regularly (e.g., for each payroll period determined specifically for each employer), an "Imputed Income Report" to the employer and/or the employer's payroll system. The Imputed Income Report indicates for each employee and in total for each employer (and in subtotal for each of the employer's divisions, if any) the amount of imputed income reportable for each participating employee under then applicable federal income tax rules on account of such employee's benefit elections, such as imputed income due to group life insurance in a face amount in excess of $50,000 on the life of the employee.

Further, the health and welfare benefit enrollment and billing system 1 can create billing statements, preferably, on a monthly or other appropriate interval, showing the premiums and/or administrative fees due for each benefit provided through or administered by such plan provider for all employees electing such benefits or services to the participating plan provider. Preferably, the billing statements show the total premiums and/or administrative fees due such provider by the employer for such period and show the employer the total premiums and/or administrative fees due the subject plan provider for such period. Typically, the billing statements are transmitted to the employers for payment and then transmitted to the respective plan providers to substantiate the amounts due. It should be understood that the invention's billing capabilities are not restricted to benefits that are selectable by employees on the enrollment form. It can also bill other types of plan related premiums and expenses, such as benefits that are "attached" to other benefits and not independently selectable by the employees (e.c., a separate prescription card given with some, but not all, medical insurance elections), and expenses or premiums that are directly related to participating employees or their benefit selections, but are not separately charged to the employees (e.g., stop loss insurance premiums that are applicable with respect to employees electing benefits for which the employer is self-insured and plan administrative expenses).

Still further, the health and welfare benefit enrollment and billing system 1 can generate reports including supporting detailed information needed by each participating plan provider, such as the identity of each employee and dependent enrolled in a specific benefit plan and the selected level of coverage, or a count or total of employees or dependents enrolled in certain benefit plans and having certain coverage. Also, the health and welfare benefit enrollment and billing system 1 can generate appropriate reports including supporting detailed information for the employer, such as a detailed list of premiums and fees due each plan provider for each payroll period subtotaled by division or other desired subset of the employer needed for management or accounting purposes.

Still even further, the health and welfare benefit enrollment and billing system 1 can generate reports including, for example, information describing payroll deductions or credits generated by the benefit plan for each employee (separated into both pre-tax and after-tax amounts), as well as information about the health and welfare benefit plans which is required to be reported by the plan provider or other third parties to regulatory authorities, such as the IRS and the US Department of Labor.

Finally, as an additional feature to facilitate efficient reporting to participating plan providers of accurate information needed about participating employees, the health and welfare benefit enrollment and billing system 1 can create various supplemental reports. These supplemental reports can include, for example, an "Underwriters' Exception Report," which is generated periodically (typically monthly or with each billing statement) and which lists employees having exceptional circumstances, such as those awaiting evidence of insurability, those on disability, and those whose employment terminated during the period, and an "Employee Census Report," which is generated on demand and which lists all active employees and information about each needed by certain plan providers for underwriting review and other purposes.

In step S11, if evidence of insurability or other prerequisites are required to be provided by the employee for approval of a requested benefit, the benefit plan administrator or plan provider notifies the employee and control in such cases passes to step S12.

In step S12, if the required prerequisites are met by the employee and approved by the plan provider, then confirmation of the approval is issued to the employee and control passes to step S13 where the health and welfare benefit enrollment and billing system 1 appropriately adds an enrollment record for the employee in the enrollment history table to reflect that the prerequisites have in fact been met and the date of approval thereof by the plan provider. If the prerequisites are not approved, then control passes to step S14 and the employee is denied the requested benefit.

Figure 6:
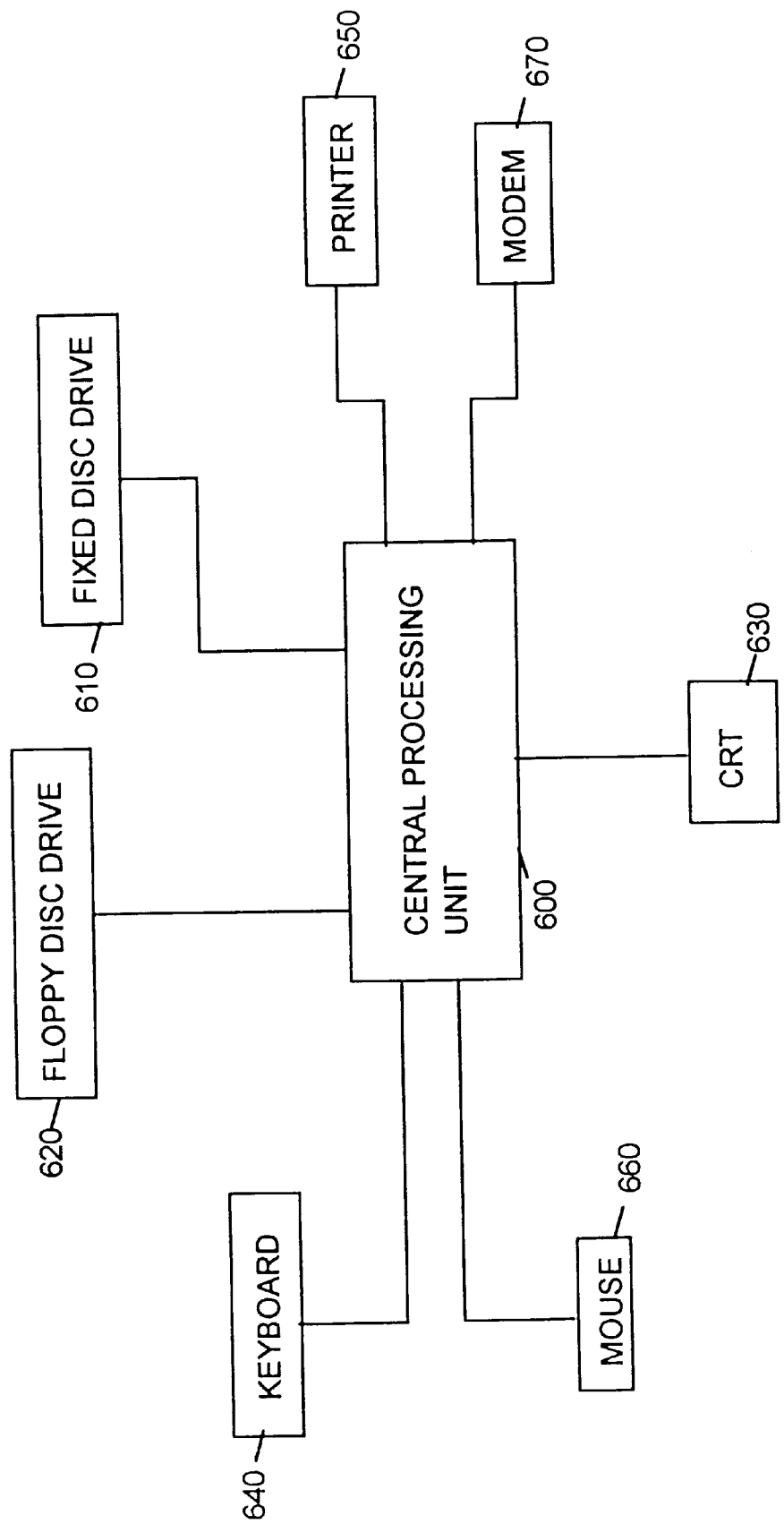
FIG. 6 is a block diagram of a representative hardware installation for the health and welfare benefit enrollment and billing system of FIG. 1.

FIG. 6 illustrates a representative hardware installation for the health and welfare benefit enrollment and billing system 1. As shown in FIG. 6, the hardware installation comprises a central processing unit 600, a fixed disk drive mass storage device 610, a floppy disk drive unit 620, a CRT type display monitor or terminal 630, a keyboard data entry device 640, and a printer 650. The type of printer needed is determined by the style of reports, forms, and bills desired to be generated by the invention. For example, a dot matrix or other impact type printer is needed if the user of the invention wants to print multiple part forms (e.g., an original and 2 copies). Otherwise, laser jet or ink jet type printers are preferred for faster output and higher resolution.

As further shown in FIG. 6, functionality of the health and welfare benefit enrollment and billing system 1 can be improved by further providing a mouse or other pointing device 660 and a modem and telephone connection 670 to enable receipt from outside sources of computer files containing information to be read by the invention, or computer files generated by the invention to be transmitted (bi-directionally) electronically rather than via printouts on paper, or copies on removable computer diskettes to be physically exchanged, such as with participating providers and/or other interested parties.

It should be appreciated that the invention is not limited to use on the computer system as described thus far. For example, some users of the invention may operate the invention with more sophisticated computer equipment, such as a local area network utilizing an IBM mini or mainframe style computer system with multiple terminals and input and output devices.

It will be apparent to those skilled in the art that various modifications and variations can be made in the health and welfare benefit enrollment and billing system and method of the present invention without departing from the spirit or scope of the invention. Thus, it is intended that the present invention cover the modifications and variations of this invention provided they come within the scope of the appended claims and their equivalents.

What is claimed is:

1. A health and welfare benefit enrollment and billing system, comprising:

enrolling means for enrolling at least one person in at least one health and welfare benefit plan provided by at least one health and welfare benefit plan provider, said enrolling means including means for recording an enrollment history for the at least one person, said enrollment history including a plurality of records, said plurality of records including one or more records identifying historical coverage options, a record identifying present coverage options, and one or more records identifying future coverage options, said means for recording being operative to generate a new record each time a modification is made to an enrollment;

means for determining whether the at least one person has met a prerequisite to being enrolled in a future coverage option in the at least one health and welfare benefit plan; and means, responsive to said means for determining, for adding a record to said enrollment history that reflects that said prerequisite has been met; and bill generating means for generating a bill for fees due to the at least one health and welfare benefit plan provider as a result of the enrollment of the at least one person in the at least one health and welfare benefit plan.

2. The system of claim 1, wherein the enrolling means and the billing means are integrated as a single computerized database management system.

3. The system of claim 1, wherein the enrolling means and the billing means are integrated as a plurality of interconnected computerized database management systems.

4. The system of claim 1, wherein the enrolling means includes:

enrollment form generating means for generating an enrollment form for enrolling the at least one person in any of a plurality of health and welfare benefit plans provided by a plurality of health and welfare benefit plan providers; and receiving means for receiving the enrollment form when completed by the at least one person.

5. The system of claim 4, wherein the enrollment form, when completed by the at least one person, meets all enrollment application requirements of each of the plurality of health and welfare benefit plan providers.

6. The system of claim 4, wherein the enrollment form is individualized for the at least one person.

7. The system of claim 1, further comprising confirmation generating means for generating a confirmation of an enrollment status of the at least one employee.

8. The system of claim 7, wherein the confirmation is individualized for the at least one employee.

9. The system of claim 8, wherein the confirmation is further individualized for the at least one health and welfare benefit plan provider.

10. The system of claim 1, further comprising report generating means for generating at least one report desired by the at least one health and welfare benefit plan provider.

11. The system of claim 10, wherein the at least one report includes any one of a salary impact report, an imputed income report, an underwriter's exception report, and an employee census report.

12. The system of claim 10, wherein the at least one report is individualized for the at least one health and welfare benefit plan provider.

13. The system of claim 1, wherein the enrolling means includes means for creating a negative enrollment for the at least one person.

14. A health and welfare benefit enrollment and billing method, comprising the steps of:

entering data into one of a single computerized database management system and a plurality of interconnected computerized database management systems;

enrolling at least one person in at least one health and welfare benefit plan provided by at least one health and welfare benefit plan provider in accordance with the data entered into the one of the single computerized database management system and the plurality of interconnected computerized database management systems, wherein the step of enrolling includes the step of recording an enrollment history for the at least one person, said enrollment history including a plurality of records, said plurality of records including one or more records identifying historical coverage options, a record identifying present coverage options, and one or more records identifying future coverage options, wherein the step of recording includes the step of generating a new record each time a modification is made to an enrollment;

determining whether the at least one person has met a prerequisite to being enrolled in a future coverage option in the at least one health and welfare benefit plan;

if it is determined that said prerequisite has been met, then adding a record to said enrollment history that reflects that said prerequisite has been met; and generating a bill for fees due to the at least one health and welfare benefit plan provider as a result of the enrollment of the at least one person in the at least one health and welfare benefit plan in accordance with the data entered into the one of the single computerized database management system and the plurality of interconnected database management systems.

15. The method of claim 14, wherein the step of enrolling the at least one person includes the steps of:

generating an enrollment form for enrolling the at least one person in any of a plurality of health and welfare benefit plans provided by a plurality of health and welfare benefit plan providers; and receiving the enrollment form when completed by the at least one person.

16. The method of claim 15, wherein the enrollment form, when completed by the at least one person, meets all enrollment application requirements of each of the plurality of health and welfare benefit plan providers.

17. The method of claim 15, wherein the enrollment form is individualized for the at least one person.

18. The method of claim 14, further comprising the step of generating a confirmation of an enrollment status of the at least one employee.

19. The method of claim 18, wherein the confirmation is generated in accordance with the data entered into the one of the single computerized database management system and the plurality of interconnected computerized database management systems.

20. The method of claim 19, wherein the confirmation is individualized for the at least one employee.

21. The method of claim 20, wherein the confirmation is further individualized for the at least one health and welfare benefit plan provider.

22. The method of claim 14, further comprising the step of generating at least one report desired by the at least one health and welfare benefit plan provider.

23. The method of claim 22, wherein the at least one report is generated in accordance with the data entered into the one of the single computerized database management system and the plurality of interconnected computerized database management systems.

24. The method of claim 23, wherein the at least one report includes any one of a salary impact report, an imputed income report, an underwriter's exception report, and an employee census report.

25. The method of claim 23, wherein the at least one report is individualized for the at least one health and welfare benefit plan provider.

26. The method of claim 14, wherein the step of enrolling the at least one person in the at least one health and welfare benefit plan includes the step of creating a negative enrollment for the at least one person.

27. The system of claim 1, wherein said prerequisite is evidence of insurability.

28. The method of claim 14, wherein said prerequisite is evidence of insurability.

29. A health and welfare benefit enrollment and billing method, comprising the steps of:

entering data into one of a single computerized database management system and a plurality of interconnected computerized database management systems;

enrolling at least one person in at least one health and welfare benefit plan provided by at least one health and welfare benefit plan provider in accordance with the data entered into the one of the single computerized database management system and the plurality of interconnected computerized database management systems, wherein the step of enrolling includes the step of recording an enrollment history for the at least one person, said enrollment history including a plurality of records, said plurality of records including one or more records identifying historical coverage options, a record identifying present coverage options, and one or more records identifying future coverage options, wherein the step of recording includes the step of generating a new record each time a modification is made to an enrollment;

determining whether the at least one person has met a prerequisite to being enrolled in a future coverage option in the at least one health and welfare benefit plan; and if it is determined that said prerequisite has been met, then adding a record to said enrollment history that reflects that said prerequisite has been met.

30. The method of claim 29, wherein said prerequisite is evidence of insurability.

* * * * *